United States Patent [19]

Huang

[11] Patent Number: 5,033,294

[45] Date of Patent: Jul. 23, 1991

[54] PRESSURE GAUGE

[76] Inventor: Tien-Tsai Huang, No. 4, La. 30, Wu-Chang St., Pan-Chiao City, Taiwan

[21] Appl. No.: 535,173

[22] Filed: Jun. 8, 1990

[51] Int. Cl.⁵ .................. B60C 23/02; G01L 7/16
[52] U.S. Cl. ................................. 73/146.8; 73/744
[58] Field of Search ............... 73/146.8, 744, 146.3; 33/203.11, 836

[56] References Cited

U.S. PATENT DOCUMENTS

| | | | |
|---|---|---|---|
| 3,696,668 | 10/1972 | Patrick | 73/146.8 |
| 4,884,175 | 11/1989 | Weng | 73/146.8 |
| 4,916,944 | 4/1990 | Ho-Chuan | 73/146.8 |

Primary Examiner—Donald O. Woodien
Attorney, Agent, or Firm—Ladas & Parry

[57] ABSTRACT

A pressure gauge for measuring the pressure of a tire, which can also measure the depth of grooves in the tread of a tire includes a housing, which has a face with indicating scales and a side with an opening, the side being perpendicularly connected to the face of the same. It also has tube member with two open ends, the first open end extending outward from the housing and the second open end extending inward into the same. An elongated rod with two ends, the first end being retractably disposed in the tube member and the second end protruding from the opening in the housing and a neck portion is integrally formed and connected with the opening in the housing. An outer member is fitted over the neck portion.

1 Claim, 2 Drawing Sheets

PRESSURE GAUGE

BACKGROUND OF THE INVENTION

This invention relates to a pressure gauge for measuring the pressure of a tire, more particularly to a pressure gauge with a new construction which can also measure the depth of the grooves in the tread of a tire.

FIG. 1 is a cross sectional view of a pressure gauge according to U.S. Pat. No. 4,715,222. Accordingly, a pressure gauge for measuring the pressure of a tire includes a housing having an indicating board on one side thereof; an axle rotatably mounted in the housing; a pinion member fixedly mounted on the axle; an indicator for displaying the degree of rotation of the axle; a pair of supporting rods fixedly mounted in the housing to support a sheet; a tube member including an inner end extending to the housing and in a perpendicular position relative to the axis of the axle and an outer end extending away from the housing and said outer end being adapted to communicate with the valve of a tire; a seal member movably disposed in the outer end of the tube member, the position of which when engaged with a tire will be determined by the pressure of that tire; an abutting member disposed in and forming a seal with the outer end of the tube member abutting the seal member; a compression spring disposed in the tube member biasing the abutting member and hence the seal member against the pressure exerted on the seal member; a rack member movably disposed in the tube member and having a lower end extending outward from the tube member so as to mesh with the pinion member to rotate the axle; a tension spring connecting the abutting member with the rack member; a post fixedly mounted in the housing for incorporating with the pinion member to restrict the rack member to pass therebetween; a pin pivotedly mounted in the housing as a spring mount; a blocking member normally brought into engagement with the surface of the axle to create friction therebetween when the axle is driven to rotate by the rack member as the abutting member is forced downward by the pressure of a tire, the force of said friction being adjusted higher than the tension force of the tension spring. Only when the blocking member is released from the axle, will the rack member be pulled by the tension spring back to its original position.

In the prior art the pressure gauge can only measure the air pressure of a tire. But cars traveling on long journeys also need good traction and if the grooves on the tread of a tire wear out, that traction is lost and the car can slip or slide on the road. To check the depth of the grooves in the tire tread, the driver needs to carry another device. This situation is inconvenient.

SUMMARY OF THE INVENTION

It is therefore, the main object of the present invention is to provide a pressure gauge with a new structure which enables it to measure both the air pressure of a tire and the depth of grooves in the tire tread.

According to this invention, a pressure gauge includes a housing having a face with indicating scales and a side with an opening, the side being perpendicularly connected to the face; a axle with a pinion member rotatably mounted in said housing; a tube member having a first open end and a second open end, the first open end extending outward from said housing and adapted to connect to the valve of a tire and the second open end extending inward into said housing and facing the opening of the same; an elongated rod having a first end and a second end, the first end being retractably disposed inside the tube member, the second end having a scale marked on it and extending to the opening in the housing and said rod being mounted in such a way that it will protrude from the opening of the housing when the first open end of the tube member engages the valve of a tire, pushing the elongated rod downward; a neck portion integrally connected to the opening in the housing; a outer member movably sleeved over the neck portion; and means for temporarily stopping the movement of the elongated rod from retracting.

BRIEF DESCRIPTION OF THE DRAWINGS

Other features and advantages of the invention will become apparent in the following detailed description of the preferred embodiment with reference to the accompanying drawings, in which:

FIG. 3 (B) depicts a pressure gauge of the present invention in use.

DETAILED DESCRIPTION OF THE PREFERRED EMBODIMENT

Figure 1:
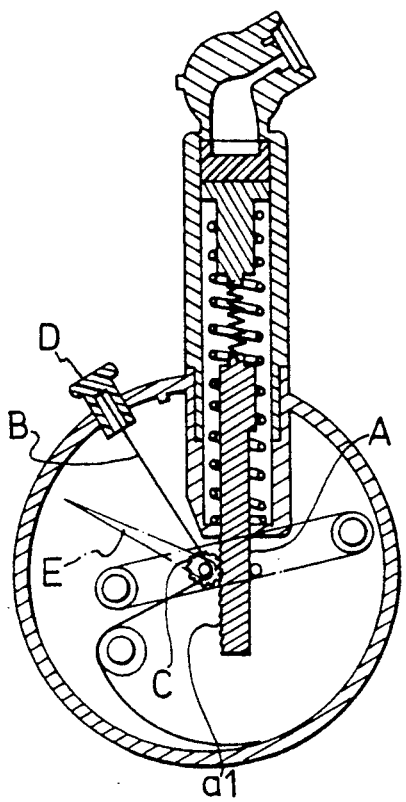
FIG. 1 is across sectional view of a pressure gauge according to U.S. Pat. No. 4,715,222.
Figure 2:
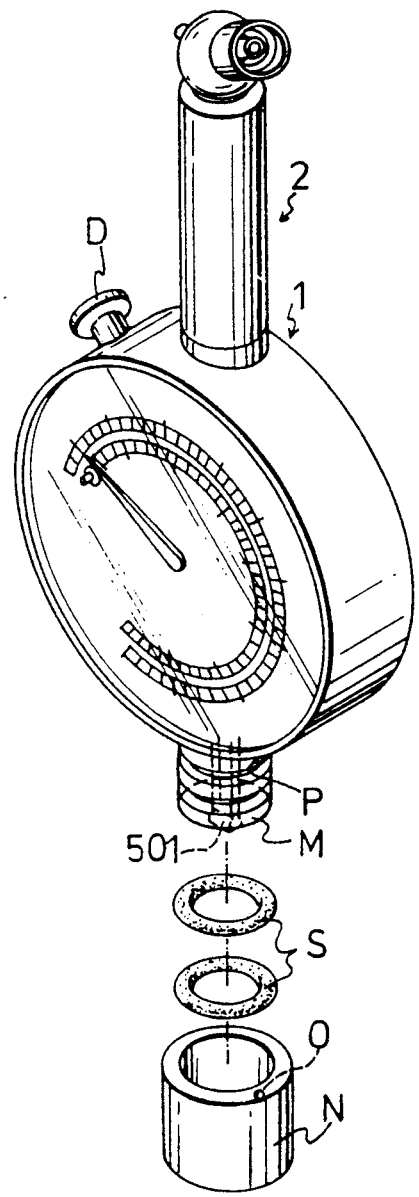
FIG. 2 is a partially exploded view of the preferred embodiment of a pressure gauge according to the present invention.
Figure 3A:
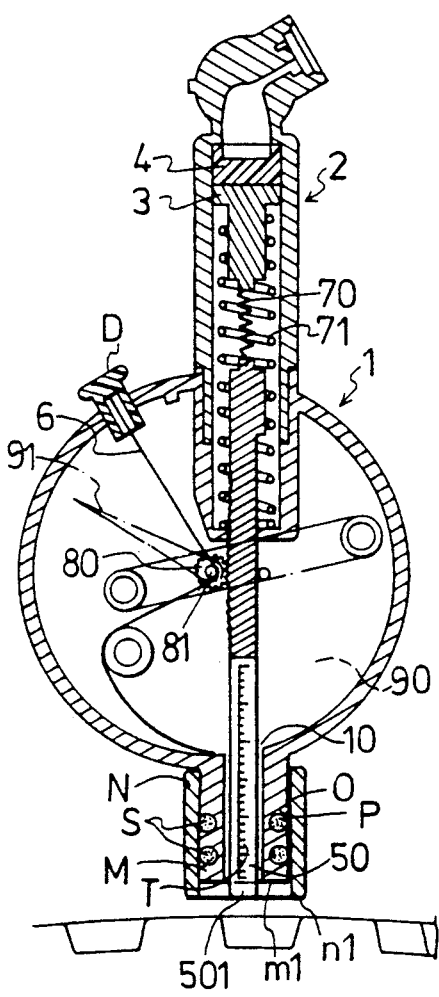
FIG. 3 (A) is a cross sectional view of the preferred embodiment of a pressure gauge according to the present invention.
Figure 3B:
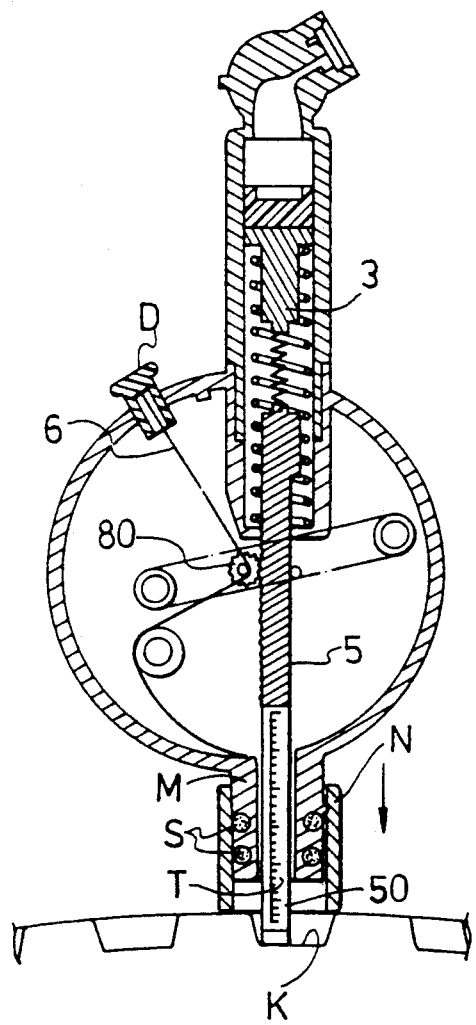

FIGS. 2 and 3(A) show a pressure gauge according to the present invention. It includes a housing 1 having a face 90 with an indicator 91 and indicating scales (92) and an opening 10; an axle 81 with a pinion 80; a tube member 2 having a seal member 4, an abutting member 3, a compression spring 70, a tension spring 71, a torsion spring 6, and a blocking member D.

The abovementioned parts are all the same as in U. S. Pat. No. 4,715,222 except the housing 1, wherein an opening 10 is formed on a side which is perpendicularly connected to the face 90 of the same housing. An elongated rod 5 having a first end 51 retractably disposed inside the tube member 2 and a second end 50 with a scale T marked on it. A neck portion m is integrally connected to the opening 10 in the housing 1. An outer member N is movably sleeved on the neck portion M. A plurality of protrusions P is formed on the outer surface of the neck portion M, and some clamping plates 0 are provided at the inner surface of the outer member N so that the outer member N is engaged by the protrusions when fitted over the neck portion M. A plurality of 0-shaped rings S are sleeved on the neck portion M and engaged between the neck portion M and the outer member N. From its retracted position, the elongated rod 5 can be pulled by gripping the enlarged end 501 of the second end 50 of the elongated rod 5 which is protruding from the neck portion M.

To measure the pressure of a tire, the pressure exerted on the first end of the tube member will push the elongated rod downward, so that the second end 50 with marked scales will protrude through the neck portion. One can simply measure the depth of the grooves in the tread by placing the outer member on the tread of a tire. The elongated rod will shrink back into the housing only when the blocking member D is pushed into the housing so that it is released from the axle by a torsion spring which engages it.

With the invention thus explained, it is obvious to those skilled in the art, that several modifications and variations can be made without departing from the scope and spirit of the present invention. It is therefore, intended this invention be limited as in appended claims, so as to encompass all such modifications and equivalent arrangements.

What I claim is:

1. A pressure gauge for measuring the pressure and the depth of the grooves in the thread of a tire comprising:
    a housing having a face with an indicating scale and a side portion with an opening;
    a neck portion connected with said opening;
    an outer member fitted over said neck portion;
    at least one ring in an O-shaped cross section engaged between the outer member and the neck portion;
    means for preventing disengagement of the outer member and said neck portion provided at the inner surface of the outer member;
    a tube member having a first open end extending outwardly from the side portion of the housing and being connected with a valve of a tire, and a second open end extending inwardly into the housing and facing said opening on the side portion of the housing;
    an elongated rod having a first end retractably disposed inside said tube member, and a second end with an enlarged head portion extending outwardly through said opening on the side of the housing and marked with scales, whereby said second end is capable of protruding from said opening beyond the neck portion and the outer member; and
    means for temporarily stopping said second scaled end of the rod withdrawn from a protruded position.

* * * * *